United States Patent
Reif

(10) Patent No.: US 10,459,234 B2
(45) Date of Patent: Oct. 29, 2019

(54) CONTROLLING A HEAD-MOUNTED DISPLAY SYSTEM IN LOW POWER SITUATIONS

(71) Applicant: Facebook, Inc., Menlo Park, CA (US)

(72) Inventor: Daniel Jacob Reif, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 128 days.

(21) Appl. No.: 15/690,219

(22) Filed: Aug. 29, 2017

(65) Prior Publication Data

US 2019/0064522 A1 Feb. 28, 2019

(51) Int. Cl.

| H02J 7/00 | (2006.01) |
|---|---|
| G02B 27/01 | (2006.01) |
| G06F 1/3212 | (2019.01) |
| G06F 1/3218 | (2019.01) |
| G06F 1/3234 | (2019.01) |
| G06F 3/01 | (2006.01) |

(52) U.S. Cl.
CPC ....... *G02B 27/0172* (2013.01); *G06F 1/3212* (2013.01); *G06F 1/3218* (2013.01); *G06F 1/3265* (2013.01); *H02J 7/0047* (2013.01); *G06F 3/011* (2013.01)

(58) Field of Classification Search
CPC ........... H02J 7/0047; H02J 7/32; G06F 1/163; G09G 3/3208; G02B 27/01; H04B 1/385; A63F 13/00
USPC .................. 320/114; 345/690, 212; 455/90.3
See application file for complete search history.

(56) References Cited

U.S. PATENT DOCUMENTS

| 9,729,864 | B2 | 8/2017 | Stafford | |
|---|---|---|---|---|
| 2008/0116849 | A1* | 5/2008 | Johnston | H02J 7/32 320/114 |
| 2013/0286053 | A1* | 10/2013 | Fleck | G09G 3/3208 345/690 |
| 2015/0105035 | A1* | 4/2015 | de Oliveira | H04B 1/385 455/90.3 |
| 2016/0049108 | A1* | 2/2016 | Yajima | A63F 13/00 345/212 |
| 2016/0171771 | A1 | 6/2016 | Pedrotti et al. | |
| 2016/0313790 | A1 | 10/2016 | Clement et al. | |
| 2016/0350973 | A1 | 12/2016 | Shapira et al. | |

(Continued)

OTHER PUBLICATIONS

United States Office Action, U.S. Appl. No. 15/633,416, dated Aug. 7, 2018, seventeen pages.

*Primary Examiner* — Abdul-Samad A Adediran
(74) *Attorney, Agent, or Firm* — Fenwick & West LLP

(57) ABSTRACT

The present disclosure relates to head-mounted displays (HMDs) and HMD controllers and to managing low power situations. As the HMD and controller are operational, the HMD monitors the energy level of the batteries. If the HMD detects that a battery energy level is below a first threshold, the HMD sends a low battery command to a developer application. The low battery command causes the developer application to enter a low battery mode in which it performs operations that encourage the user to charge the battery. If the energy level of the battery continues to decrease, the HMD may detect the battery energy is below a second threshold. As a result, the HMD and controller enter into a pass-through mode. In a pass-through mode the HMD projects a representation of an operating environment of the HMD in a display of the HMD.

16 Claims, 4 Drawing Sheets

(56) References Cited

U.S. PATENT DOCUMENTS

2017/0040815 A1* 2/2017 Todasco ................ H02J 7/0047
2017/0293144 A1* 10/2017 Cakmakci .............. G02B 27/01
2018/0059788 A1* 3/2018 Noguchi ................. G06F 1/163

* cited by examiner

CONTROLLING A HEAD-MOUNTED DISPLAY SYSTEM IN LOW POWER SITUATIONS

BACKGROUND

The present disclosure relates to a head-mounted display (HMD) system and specifically, to controlling an HMD in low power situations.

HMDs may be used to present information to a user through an immersive experience. This information may include traditional still images or videos, but often includes augmented and/or virtual reality. HMDs are useful in a variety fields including gaming, engineering, medicine, and aviation. To enhance the user experience, an HMD may include a controller that allows the user to interact with content displayed on the HMD.

Despite the numerous possible uses for HMDs, conventional HMDs can be bulky and impractical for prolonged use or use outside of controlled environments. Thus, smaller, lighter, battery-powered, wireless HMDs are desirable. To effectively achieve this, HMD makers are increasingly moving towards smaller and lighter form factors. However, as form factors shrink, the capacity of batteries within HMDs and controllers becomes more limiting. Thus, an HMD system that can effectively manage low power situations is desirable.

SUMMARY

The present disclosure relates to head-mounted displays (HMDs) and HMD controllers, and specifically, to managing low power situations.

An HMD may execute a developer application that causes graphics to be displayed on a display device of the HMD. The HMD monitors a power level of a battery powering a component of the HMD. The HMD detects that the power level of the battery is below an upper threshold value. Responsive to detecting that the power level of the battery falls below the upper threshold value, the HMD sends a low battery command via an application programming interface to the developer application being executed by the HMD. This enables the developer application to detect the low battery power and go into a low power mode.

In some embodiments, the HMD also detects that the power level of the battery falls below a lower threshold. Responsive to detecting that the power level of the battery falls below the lower threshold, the HMD initiates a pass-through mode of the HMD in which the HMD projects a representation of an operating environment of the HMD in a display direction of the display device.

In some embodiments, in the pass-through mode, a camera, powered by ambient light incident on the camera, of the HMD displays images captured from the camera on the display device.

In some embodiments, in the pass-through mode, the HMD induces a display screen of the display device to become transparent to enable a user of the HMD system to view the operating environment through the display screen.

In some embodiments, in the pass-through mode, the HMD causes a shutter element of the HMD system to be mechanically opened to allow outside light to be directed to eyes of a user of the HMD system such that the user can view the operating environment.

In some embodiments, in the pass-through mode, the HMD causes a mirror element of the HMD system to be re-directed to reflect outside light to eyes of a user of the HMD system such that the user can view the operating environment.

DETAILED DESCRIPTION

Figure 1:
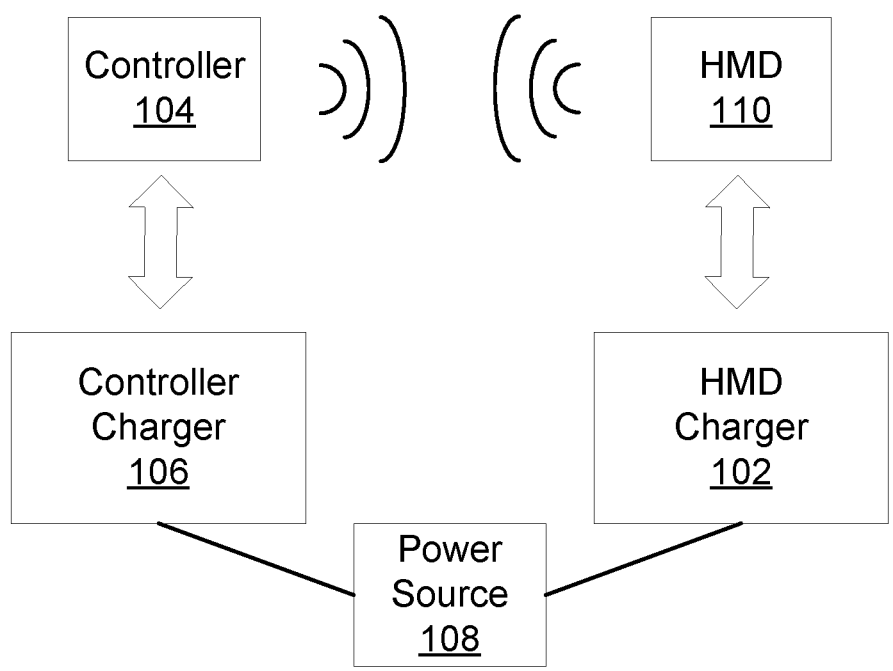
FIG. 1 (FIG. 1) is a block diagram illustrating an HMD system, according to one embodiment.

FIG. 1 illustrates an embodiment of an HMD system 100. The HMD system comprises a head-mounted display (HMD) 110, an HMD controller 104, respective charging devices including an HMD charger 102 and a controller charger 106, and power source 108. In alternative embodiments, the HMD system 100 may include additional or different components. For example, an HMD system 100 may include multiple controllers 106, chargers 102, 106 or power sources 108. Additionally, the controller charger 106 and HMD charger 102 may be integrated into a single physical device.

The HMD 110 comprises a computer device with a display that may be mounted on a user's head. The HMD 110 may also optionally include speakers, haptic feedback devices, or other output devices. The HMD 110 may include, for example, an augmented reality (AR) device, a virtual reality (VR) device, or a combined AR/VR device. In a VR device, the HMD 110 generally provides a display that enables the user to visually experience a simulated environment. The HMD 110 may be designed to partially or completely block the user's direct vision of the outside environment. Thus, the user may be completely immersed in the simulated environment and can be made to feel like the simulated reality is being experienced firsthand. For example, the display may react to changes in the user's head position and/or gaze to display images or video mimicking the experience of looking around in the simulated environment.

In an AR device, computer-generated images or text are presented to the user in combination with the external environment so as to supplement or augment the user's reality. For example, text or images may be presented in a way that lets the user concurrently view the external environment directly and view the computer-generated content. In another embodiment, a representation of the user's environment may be captured (e.g., by a camera), augmented in some way, and re-projected by the HMD 110. Here, the HMD 110 may capture the user's environment in a manner that simulates the user's natural line of sight such that users experiences an augmented version of the surroundings. In a combined AR/VR device, the HMD 110 can provide either VR or AR experiences depending on the particular application being executed.

The HMD 110 may be implemented in various form factors such, as for example, a traditional VR headset, an eye glasses form factor, an eye contact lens form factor, or other form factors. An example HMD 110 is the OCULUS RIFT VR HEADSET made by OCULUS VR, LLC of Irvine, Calif. An embodiment of an HMD 110 will be described in further detail below with respect to FIG. 3.

The controller 104 is a device communicatively coupled with the HMD 110 that includes various controls to enable the user to provide inputs to the HMD 110. The controller 104 may be, for example, a handheld remote controller, keyboard, mouse, gamepad, joystick, gesture recognition etc. In addition, the controller 104 may provide one or more outputs in response to the user's actions or based on feedback received from the HMD 110. For example, the controller 104 may include a display, speakers, and/or haptic feedback device. In an embodiment, two or more controllers 106 may be simultaneously used by a single user and may operate together to provide inputs to the HMD 110.

The controller 104 and HMD 110 are communicatively connected so as to enable communication of information between each other. For example, the controller 104 may send input data to the HMD 110 representing commands received by the user. Furthermore, the HMD 110 may send back data to the controller 104 (e.g., to cause the controller 104 to vibrate). Furthermore, the controller 104 may send hardware information related to the controller 104 to the HMD 110, such as the energy level of the controller battery (described with reference to FIG. 2) or the controller 104 location with respect to the HMD 110. The connection between the controller 104 and the HMD 110 may be wireless (e.g., via Wi-Fi, Wi-Fi Direct, Bluetooth, or other wireless communication technology) or wired.

If connected to a power source 108 and to the HMD 110, the HMD charger 102 provides electrical energy to the HMD 110 to be stored in the HMD battery. Similarly, when connected to the power source 108 and to the controller 104, the controller charger 106 provides electrical energy to the controller 104 to charge the battery of the controller 104. The HMD charger 102 and the controller charger 106 may each be attached or integrated as a part of the HMD 110 or the controller 104, or they may be physically separate components. Furthermore, the HMD charger 102 and the controller charger 106 may be separate from each other or integrated into a single device. If either of the HMD charger 102 or controller charger 106 are separate components, the HMD 110 may track the physical location of the HMD charger 102 and/or controller charger 106 via a global positioning system (GPS) or indoor positioning technology (e.g., proximity sensors or signal triangulation). The HMD charger 102 and the controller charger 106 may charge the HMD 110 and the controller 104 respectively via conventional wired charging or via a wireless charging technology such as, for example, inductive charging.

The power source 108 is a source of accessible electrical energy that may be used to power the HMD 110 or controller 104, such as a 120V or 240V wall socket or external battery. Each charger 102, 106 may be connected to separate power sources 108 or the same power source 108, as depicted in FIG. 1.

Figure 2:
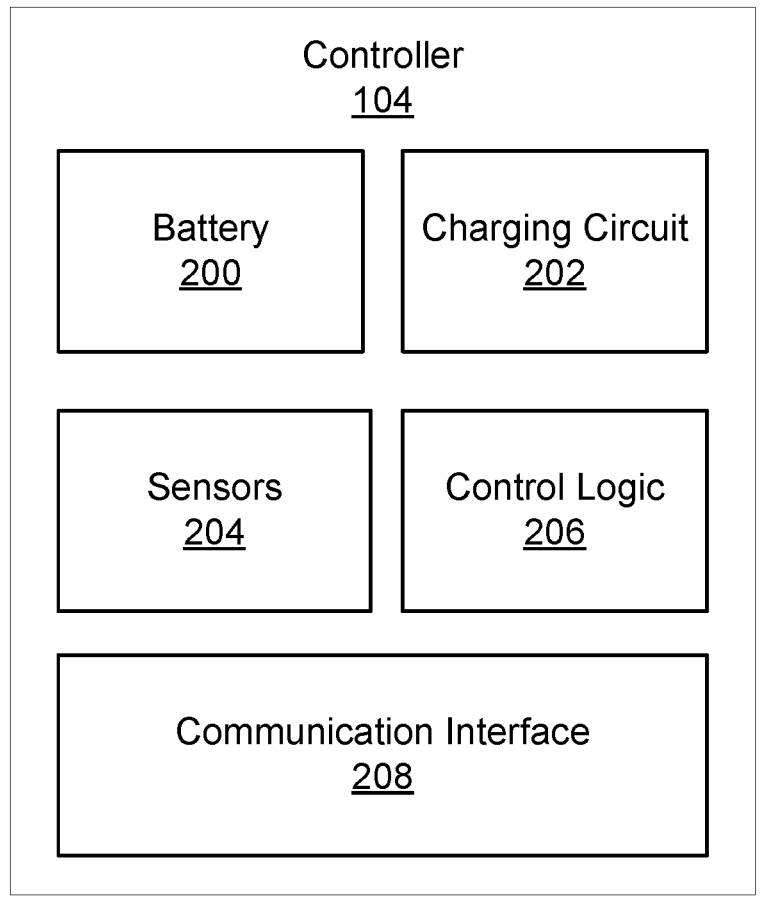
FIG. 2 is a block diagram illustrating a controller for an HMD, according to one embodiment.

FIG. 2 is a block diagram illustrating modules of the controller 104, according to one embodiment. The controller 104 may include, among other components, a battery 200, charging circuit 202, sensors 204, control logic 206, and a communication interface 208. In alternative embodiments, the controller 104 may include additional or different components.

The battery 200 stores electrical energy and provides the electrical energy to power electrical components of the controller 104. The battery may only store a limited amount of energy and must be periodically recharged using the charging circuit 202.

The charging circuit 202 is a circuit for recharging the battery 200. Upon interaction with the controller charger 106, the charging circuit 202 provides electrical energy to the battery 200. The charging circuit 202 could use inductive charging methods or it may be hardwired to the battery 200. As the controller 104 experiences motion, the charging circuit 202 may also capture kinetic energy, convert it into electrical energy, and charge the battery 200. Alternatively, the charging circuit 202 may use other energy harvesting technologies to capture various forms of ambient energy and charge the battery 200.

The sensors 204 detect or measure physical properties and record, indicate, or otherwise respond to the physical properties. The physical properties may include, for example, motion of the controller 104, orientation of the controller 104, location of the controller 104, or stimulus applied to the controller 104 from the user. The sensors 204 may be implemented, for example, using devices such as an accelerometer, an inertial measurement unit, a GPS sensor, or indoor position sensor.

The communication interface 208 is a module which establishes a communication channel between the controller 104, and HMD 110. The communication interface 208 may also establish a communication channel with other devices such as another computer system or server (e.g., directly or via a network). The communication interface 208 may transmit and/or receive data, information, and instructions, generally relating to the controller 104 or the HMD 110. The communication interface 208 may operate via a wired connection or a wireless connection such as Bluetooth, Wi-Fi, optical signal, etc.

The control logic 206 includes logic for controlling various functions of the controller 104 such as, for example, processing inputs received from the user, generating outputs, monitoring the battery level, or controlling any other components that may be found in a controller 104 which were not already discussed.

Figure 3:
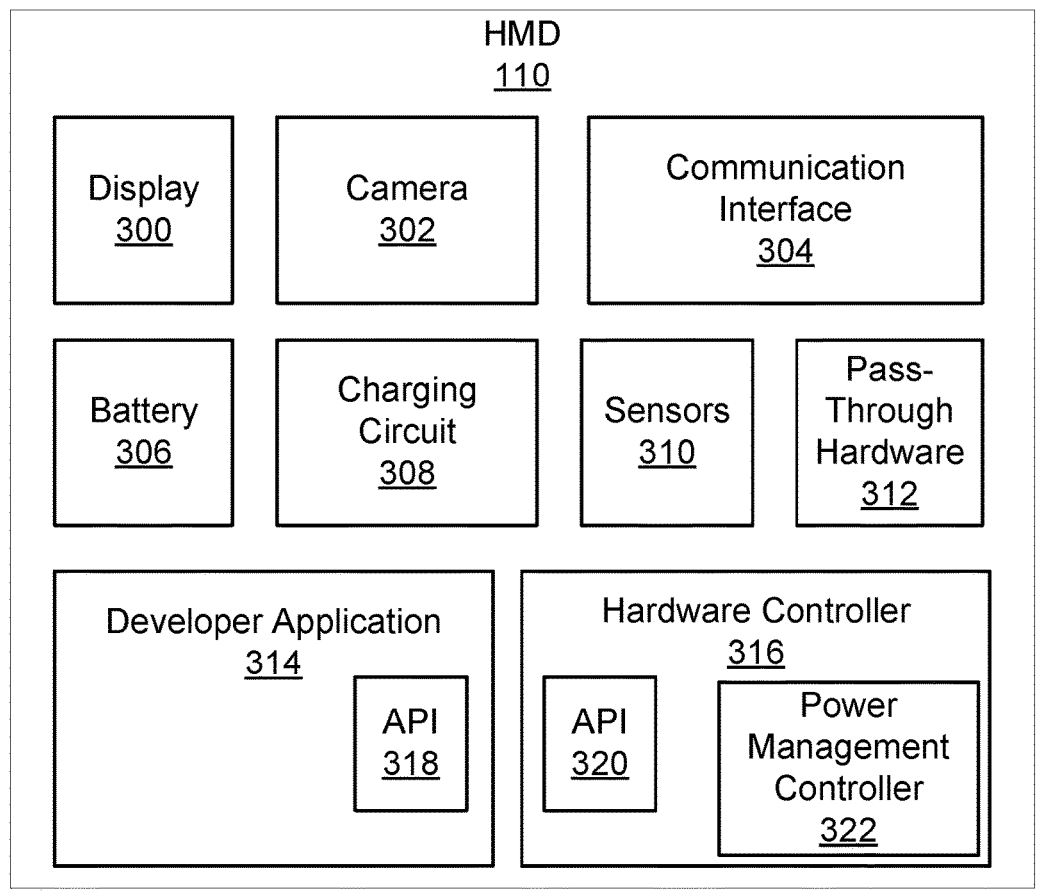
FIG. 3 is a block diagram illustrating an HMD, according to one embodiment.

FIG. 3 is a block diagram illustrating the modules of the HMD 110, according to one embodiment. The HMD 110 may include, among other components, a display 300, a camera 302, a communication interface 304, a battery 306, a charging circuit 308, sensors 310, pass-through hardware 312, a developer application 314, and a hardware controller 316. The developer application 314 may further include an application programming interface (API) 318. The hardware controller 316 may further include an API 320 and power management controller 322. In alternative embodiments, the HMD 110 may include additional or different components.

The display 300 is a screen which displays images to the user. The images may comprise still images or video frames forming part of a movie, game, augmented reality experience, virtual reality experience, etc. The display 300 may comprise, for example, a liquid-crystal display (LCD), light-emitting diode (LED) display, plasma panel, electroluminescent pane, etc. Typically, during operation, the display 300 is placed proximate to the user's eyes such that the user may be immersed in the experience. In some embodiments, the display 300 is a retinal scan display or retinal projector.

The camera 302 comprises an image and/or video capture device that may capture images (or video frames) of the environment outside of the HMD 110. These images may be modified in some way to create an augmented reality experience.

The communication interface 304, battery 306, charging circuit 308, and sensors 310 may be similar to the communication interface 208, battery 200, charging circuit 202, and sensors 204 respectively of the controller 104.

The pass-through hardware 312 comprises specialized hardware that enables the HMD 110 to operate in a "pass-through mode" to enable or otherwise enhance the user's view of the external environment without removing the HMD 110. The pass-through mode may operate without any power consumption or with very low power consumption. As a result, the pass-through mode may be activated when the battery level 306 is low (e.g., below a lower threshold). The pass-through hardware 312, activated upon the HMD 110 entering the pass-through mode, may take different forms. In an embodiment, the pass-through hardware 312 comprises a shutter or other physical opening (e.g., sliding or retractable LCD screen, switchable lenses, etc.) that is closed during regular operation (thus preventing or limiting the user's view of the external environment) and which opens when the HMD 110 enters pass-through mode, allowing the user to view the outside environment through the shutter slits. In another embodiment, the pass-through hardware may include mirrors that are positioned to direct outside light to the users eye when in the pass-through mode, thus allowing the user to view the outside environment. In another embodiment, the pass-through hardware 312 includes photovoltaic cells (possibly incorporated into the camera 302 image sensors or on the outside of the HMD 110), which generate enough energy for the HMD 110 to capture images and display the surrounding environment to the user on the display 300 using very low power consumption. In another embodiment, the pass-through hardware induces the display 300 (which is otherwise opaque) to become transparent, allowing the user to view the outside environment through the display 300. The pass-through hardware 312 may include one, two, or any combination of embodiments thereof.

The pass-through hardware 312 may beneficially be activated when the battery level of the HMD battery 306 is low (e.g., below a lower threshold) or just before it is completely depleted. In a VR device in which the user is completely immersed and otherwise has no view of the external environment during regular operation, the pass-through mode enables the user to see the surrounding environment without having to remove the HMD 110. Furthermore, in an AR device that relies on a camera to project a view of the external environment onto a display, the pass-through mode beneficially enables the user to continue viewing the outside environment when the power is too low to enable the full AR experience. The pass-through mode is particularly beneficial in certain form factors of an HMD 110 such as a contact lens form factor in which it may be inconvenient to remove the HMD 110 or where the HMD 110 may be designed for continuous use. The pass-through mode may furthermore be beneficial to enable the user to safely navigate to the charger 102 without removing the HMD 110 in order to recharge the device. The pass-through mode may be controlled by either the power management controller 322 or the developer application 314, both described in further detail below.

The hardware controller 316 manages and controls the previously described hardware modules of the HMD 110 and provides a hardware platform for execution of a developer application 314 or other applications, such as the HMD operating system. For example, the hardware controller 316 may comprise a processor, memory, a graphics controller, an input controller, and associated firmware and/or software (e.g., an operating system, drivers, etc.) that enables execution of applications. The hardware controller 316 may further control various hardware components and perform general tasks such as, for example, calibrating the sensors 310 upon startup or directing energy from the battery 306 to a various hardware.

The power management controller 322 manages and controls actions associated with the energy of the batteries 200, 306 of the HMD 110 and the controller 104 respectively. For example, the power management controller 322 monitors the energy levels of the batteries 200, 306 and may optionally calculate the time before each the battery 200, 306 runs out of energy. If one or both batteries 200, 306 need charging, the power management controller 322 via the hardware controller 316 may notify the user, for example, by overlaying a notification on the display 300 or flashing a light on the outside of the HMD 110. When the battery level of the HMD battery 306 drops below a particular threshold, the power management controller 322 may furthermore cause the HMD 110 to enter the pass-through mode. If the battery 306 becomes sufficiently charged, the power management controller 322 may control the HMD 110 to exit the pass-through mode and return to normal operation.

The developer application 314 comprises an application that executes on the HMD 110. The developer application 314 may comprise, for example, a game, video player application, a sound player application, an information display application, or any other application that can execute on the HMD 110. Various instances of the developer application 314 may be developed by different developers for execution on the HMD 110. The HMD 110 may store multiple developer applications 314 that can be loaded and executed on the HMD 110. Furthermore, a developer application 314 may be loaded onto the HMD 110 from an external source (e.g., from a memory card or downloaded from a network). In some embodiments, such when no developer application 314 is running, an HMD operating system executes on the HMD.

The APIs 318, 320 comprise communication and command interfaces that operate according to a set of subroutine definitions, protocols, tools, and methods for communicating between the hardware controller 316 and the developer application 314. To execute the developer application 314 on the HMD 110, an API 318 of the developer application 314 sends commands to the API 320 of the hardware controller 316 to cause the HMD 110 to perform functions according to instructions in the developer application 314. Furthermore, the hardware controller 316 may send commands via API 320 to the API 318 of the developer application to provide various data or feedback to the developer application 314.

The APIs 318, 320 operate according to a predefined set of commands that are enabled by the HMD 110. These commands enable a developer application 314 to control the HMD 110 in a particular way, or enable the developer application 314 to request (and the HMD 110 to send) particular information to the developer application 314 that may then be processed by the instructions in the developer application 314. In some embodiments, non-developer applications, such as the HMD operating system, also use commands through the APIs 318, 320 to communicate with the HMD 110. For example, a video player application could send pixel color instructions to control the display 300 through the APIs 318, 320. The hardware controller 316 receives the request and causes the proper pixel color to be displayed on the display 300. In another example, the developer application 314 requests, via the APIs 318, 320, sensor 310 information from the HMD 110 to determine the orientation of the HMD 110.

In a particular example, the a specific API command enables the hardware controller 316 to send battery information or instructions relating to the battery 306 of the HMD 110 and/or the battery 200 of the controller 104 to the developer application 314. For example, the API command may enable battery information to be pushed from the API 320 to the API 318 (e.g., periodically or only when the battery falls below a threshold), or may enable battery information to be polled by the API 318 via the API 320. The battery information may include, for example, a battery level (e.g., expressed as a percentage of power remaining, a charge level, or other metric), an estimated time before the battery is depleted, or a battery mode (e.g., high battery, low battery, critical battery, etc.)

The API commands may furthermore enable the hardware controller 316 to send location information relating to a location of the HMD 110, controller 104, HMD charger 102, and/or controller charger 106 to the developer application 314. This information may also be pushed from the API 320 to the API 318 (e.g., periodically or when certain battery conditions or detected), or may enable the location information to be polled by the API 318 via the API 320.

By including an API command that enables the developer application 314 to obtain battery information from the hardware controller 316, the developer application 314 may beneficially execute certain functions in response to the battery information. For example, the developer application 314 may be designed to perform actions which may encourage the user to charge the controller 104 and/or the HMD 110 or reduce power consumption. These actions may be integrated into the experience provided by the developer application 314 so as to cause minimal disruption of the user's experience. Furthermore, these actions vary in implementation depending on the embodiment of the developer application 314.

For example, in one embodiment, responsive to the developer application 314 getting a low battery command indication that the battery 200 of the controller 104 is low (e.g., below a threshold), the developer application 314 may enter a low controller battery mode. In an embodiment, when operating in the low controller battery mode (after receiving the low battery command), the developer application 314 may execute a different set of instructions (or execute instructions using different parameters) than normal operation. Particularly, the developer application 314 may perform actions that encourage the user to move to the location of the controller charger 106. The developer application 314 may determine a location of the controller 104 relative to a location of the charger 106 based on location information received from the hardware controller 316 and generate an output that encourages the user to move the controller 104 to the charger location. For example, in a gaming application, upon entering the low controller battery mode, the gaming application may cause an object to appear in the game corresponding to the location of the charger 106. The object may be one that is desirable for the user to succeed in the objectives of the game. For example, in a "shooter" style game, an ammunition object may be placed at a location within the game environment that corresponds with the location of the charger 106 in the outside environment. In other types of games, coins, tokens, or other rewards may be placed at locations within the game corresponding to the physical location of the charger 106. In another embodiment, a gaming application encourages the user to be in a safe area, rather than moving into an area more dangerous to their game character, thereby permitting him or her to safely pause and recharge their HMD. In other embodiments, the developer application 314 may simply output instructions (e.g., audio or visual instructions) that direct the user to the location of the charger 106. When the user approaches the location of the charger 106, the developer application 314 may output additional instructions or provide incentives to encourage the user to connect the controller 104 to the charger 106, or in the case of wireless charging, position the controller 104 in close enough proximity to the charger 106.

In one embodiment, when the user arrives at or near the location of the charger 102, 106, the developer application 314 may automatically pause the content from the developer application 314, save the content from the developer application 314 to a memory, and/or notify the user so that the user may begin charging the HMD 110 and/or controller 104. In other embodiments, the developer application 314 may be designed such that the experience can continue in some form even while the controller is charging.

In another embodiment in which kinetic charging technology (e.g., a shake generator) is integrated with the controller 104, the developer application 314 may execute an action that encourages the user to shake or otherwise repeatedly move the controller 104 in a manner that causes the battery 200 to charge. For example, a gaming application may, upon entering the low controller battery mode in response to receiving a low battery command, initiate an action in the game in which the user is provided an incentive to move the controller 104 in a particular manner. For example, the developer application 314 may be designed to cause an object to appear that the user can shake to obtain coins, tokens, or other rewards that are desirable for succeeding in the game. In another embodiment, the developer application may provide an incentive for the user to run or repeatedly perform certain motions that enable charging of the battery 200.

In another embodiment which involves inductive charging of the controller 104 by the controller charger 106 attached to the HMD 110, the developer application 314 encourages the user to bring the HMD 110 and controller 104 near to one another. For example, a fitness gaming application may, upon receiving the low battery command, direct the user to conduct jumping jacks, which result in the user repeatedly bringing the controller 104 near the controller charger 106 attached to the HMD 110. Through inductive charging, the controller 104 may begin to charge.

Similarly, the developer application 314 may be designed to enter a low HMD battery mode upon receiving an indication (e.g., low battery command) from the hardware controller 316 that the HMD battery 306 is low (e.g., below an upper threshold). In the low HMD battery mode, the developer application 314 may similarly integrate actions that encourage the user to perform steps to enable charging of the battery 306 in the HMD 110. For example, the developer application 314 may obtain a position of the HMD 110 relative to the HMD charger 102 and provide an incentive for the user to move to that location. Furthermore, if the HMD 110 has a kinetic charger, incentives may be provided to cause the user to perform certain motions that enable the battery to charge, similar to the techniques described above. Generally, the upper threshold for entering the low HMD battery mode may be set higher than the lower threshold that causes the HMD to enter the pass-through mode. Thus, the HMD first operates to encourage the user to charge the HMD 110, but if the battery level drops too far, it may enter into the pass-through mode.

In an embodiment, the developer application 314 may continue to receive indications of the battery levels while charging the controller 104, the HMD 110, or both. When one or more of the battery levels exceeds a low battery threshold, the developer application 314 may revert to a normal operation mode. This may include the developer application 314 receiving a charged battery command from the hardware controller 316 to revert to normal operation.

In another example, the developer application 314 may monitor the rate at which the controller battery 200 and/or the HMD battery 306 are charging. The developer application 314 may switch to operating in the low controller battery mode or the low HMD battery mode if the batteries 200, 306 fail to charge at a rate faster than their respective energy consumption. Similarly, the developer application 314 may switch out of the low controller battery mode or the low HMD battery mode if the batteries 200, 306 charge at a rate faster than the energy consumption of the HMD 110 and/or controller 104 while charging.

Figure 4:
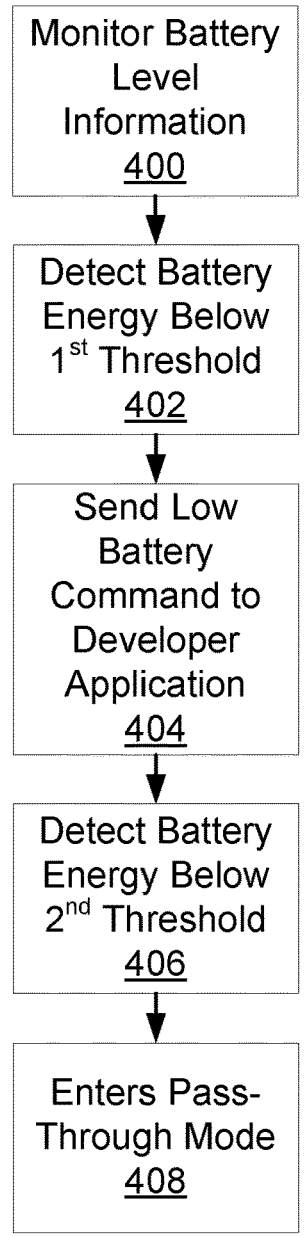
FIG. 4 is a flowchart illustrating a process for operating an HMD in response to low battery levels, according to one embodiment.

FIG. 4 is a flowchart illustrating a process executed by an HMD 110 to respond to low energy levels, according to one embodiment. The steps of the process shown in FIG. 4 may be performed by the HMD 110, the controller 104, and/or an external control device. In other embodiments, the steps may be performed in different orders, and the process may include different, additional, or fewer steps.

As the HMD 110 and controller 104 are operational, the power management controller 322 monitors 400 the energy level of a battery (e.g., the battery 200 of the controller 104 or the battery 306 of the HMD). The power management controller 322 detects 402 the battery energy is below the first threshold (e.g., upper threshold). In response, the power management controller 322 sends 404 a low battery command to the developer application 314. The low battery command causes the developer application 314 to enter a low battery mode in which it performs operations that may encourage the user to charge the battery. If the energy level of the battery continues to decrease, eventually the power management controller 322 detects 406 the battery energy is below a second threshold (e.g., lower threshold). As a result, the HMD 110 and controller 104 enter 408 into the pass-through mode. Entry into the pass-through mode may be controlled by the power management controller 322 or this control may be left to the developer in the developer application 314.

In an embodiment, the hardware controller 316 may furthermore obtain location information pertaining to the controller charger 106 relative to the controller 104 and/or location information pertaining to the HMD charger 102 relative to the HMD 110. The location information may be sent to the developer application 314 (e.g., as an API command) upon detecting a low battery condition. The developer application 314 may use the location information in the low power mode operation to encourage the user to move towards the relevant charger.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
executing a developer application on a head-mounted display system, the developer application causing graphics to be displayed on a display device of the head-mounted display system;
monitoring a power level of a battery powering a component of the head-mounted display system;
detecting that the power level of the battery is below an upper threshold value; responsive to detecting that the power level of the battery is below the upper threshold value, sending a low battery command indicative of the power level being below the upper threshold value via an application programming interface to the developer application being executed by the head-mounted display system;
detecting that the power level of the battery falls below a lower threshold;
responsive to detecting that the power level of the battery falls below the lower threshold, initiating a pass-through mode of the head-mounted display system in which the head-mounted display system projects a representation of an external environment of the head-mounted display system;

detecting that the power level of the battery is charging at a rate faster than an energy consumption of the component of the head-mounted display system; and exiting the pass-through mode responsive to the detecting that the power level of the battery is charging at the rate faster than the energy consumption of the component.

2. The method of claim 1, further comprising:

receiving a location of a battery charger of the head-mounted display system; and receiving a location of the component of the head-mounted display system;

determining a distance between the location of the battery charger and the location of the component of the head-mounted display system;

determining an orientation of the component of the head-mounted display system with respect to the charger; and sending the distance and the orientation via the application programming interface to the developer application together with the low battery command.

3. The method of claim 2, wherein, in response receiving the low battery command, the developer application enters a low battery mode that causes the developer application to provide an incentive for a user of the head-mounted display system to move to a location of charger.

4. The method of claim 1, wherein the component of the head-mounted display system comprises a handheld controller or a head-mounted display device.

5. The method of claim 1, wherein initiating the pass-through mode comprises:

inducing a display screen of the display device to become transparent to enable a user of the head-mounted display system to view the external environment of the head-mounted display system through the display screen.

6. The method of claim 1, wherein initiating the pass-through mode comprises:

causing a shutter element of the head-mounted display system to be mechanically opened to allow outside light to be directed to eyes of a user of the head-mounted display system such that the user can view the external environment.

7. The method of claim 1, wherein initiating the pass-through mode comprises:

causing a mirror element of the head-mounted display system to be re-directed to reflect outside light to eyes of a user of the head-mounted display system such that the user can view the external environment.

8. The method of claim 1, wherein initiating the pass-through mode comprises:

placing a camera of the head-mounted display system in a low power mode in which the camera is powered by ambient light incident on the camera;

displaying images captured from the camera on the display device.

9. The method of claim 8, wherein the camera captures light from the environment using photovoltaic cells.

10. A method comprising:

executing a developer application on a head-mounted display system, the developer application causing graphics to be displayed on a display device of the head-mounted display system;

monitoring a power level of a battery powering a component of the head-mounted display system, wherein the component of the head-mounted display system is a handheld controller with a kinetic charging device;

detecting that the power level of the battery is below an upper threshold value;

responsive to detecting that the power level of the battery is below the upper threshold value, sending a low battery command indicative of the power level being below the upper threshold value via an application programming interface to the developer application being executed by the head-mounted display system; and responsive to receiving the low battery command, the developer application enters a low battery mode that causes the developer application to provide an incentive for a user of the head-mounted display system to shake the controller, wherein the incentive comprises an update to an attribute within the developer application that is independent of the power level of the battery and that is desirable for advancing towards a user objective.

11. The method of claim 10, further comprising:

detecting that the power level of the battery falls below a lower threshold; and responsive to detecting that the power level of the battery falls below the lower threshold, initiating a pass-through mode of the head-mounted display system in which the head-mounted display system projects a representation of an external environment of the head-mounted display system.

12. The method of claim 11, further comprising:

detecting that the battery is charging at a rate faster than an energy consumption of the component of the head-mounted display system; and exiting the pass-through mode responsive to detecting that the power level of the battery is charging at the rate faster than the energy consumption of the component.

13. A head mounted display system comprising:

a display device for mounting on a user's head;

a battery powering the display device;

one or more processors; and a non-transitory computer-readable storage medium storing instructions that when executed by the one or more processors cause the one or more processors to perform steps including:

executing a developer application on the head-mounted display system, the developer application causing graphics to be displayed on the display device of the head-mounted display system;

monitoring a power level of the battery powering a component of the head-mounted display system;

detecting that the power level of the battery is below an upper threshold value;

responsive to detecting that the power level of the battery is below the upper threshold value, sending a low battery command indicative of the power level being below the upper threshold value via an application programming interface to the developer application being executed by the head-mounted display system;

detecting that the power level of the battery falls below a lower threshold; and responsive to detecting that the power level of the battery falls below the lower threshold, initiating a pass-through mode of the head-mounted display system in which the head-mounted display system projects a representation of an external environment of the head-mounted display system;

detecting that the power level of the battery is charging at a rate faster than an energy consumption of the component of the head-mounted display system; and exiting the pass-through mode responsive to the detecting that the power level of the battery is charging at the rate faster than the energy consumption of the component.

14. The head mounted display system of claim 13, wherein the instructions when executed further cause the one or more processors to perform steps including:

receiving a location of a battery charger of the head-mounted display system; and receiving a location of the component of the head-mounted display system;

determining a distance between the location of the battery charger and the location of the component of the head-mounted display system;

determining an orientation of the component of the head-mounted display system with respect to the charger; and sending the distance and the orientation via the application programming interface to the developer application together with the low battery command.

15. The head mounted display system of claim 14, wherein, in response receiving the low battery command, the developer application enters a low battery mode that causes the developer application to provide an incentive for a user of the head-mounted display system to move to a location of charger.

16. The head mounted display system of claim 13, further comprising:

a controller for controlling inputs to the developer application executing on the head-mounted display system;

a kinetic charging device integrated in the controller to convert kinetic energy of the controller to electrical energy for charging a battery of the controller;

wherein in response to receiving the low battery command, the developer application enters a low battery mode that causes the developer application provide an incentive for a user of the head-mounted display system to shake the controller.

* * * * *

UNITED STATES PATENT AND TRADEMARK OFFICE
CERTIFICATE OF CORRECTION

PATENT NO. : 10,459,234 B2
APPLICATION NO. : 15/690219
DATED : October 29, 2019
INVENTOR(S) : Daniel Jacob Reif Page 1 of 1

It is certified that error appears in the above-identified patent and that said Letters Patent is hereby corrected as shown below:

In the Claims

Column 14, Line 19, Claim 16, delete "provide" and insert -- to provide --.

Signed and Sealed this
Eighth Day of September, 2020

Andrei Iancu
*Director of the United States Patent and Trademark Office*